(12) United States Patent
King-Wilson

(10) Patent No.: US 12,058,166 B2
(45) Date of Patent: **\*Aug. 6, 2024**

(54) SYSTEM AND METHOD FOR ELECTRONIC RISK ANALYSIS AND REMEDIATION USING NETWORK MONITORED SENSORS AND ACTIONABLE FEEDBACK METHODOLOGIES FOR OPERATIONAL RESILIENCE

(71) Applicant: Phillip King-Wilson, Bossut-Gottechain (BE)

(72) Inventor: Phillip King-Wilson, Bossut-Gottechain (BE)

( * ) Notice: Subject to any disclaimer, the term of this patent is extended or adjusted under 35 U.S.C. 154(b) by 0 days.

This patent is subject to a terminal disclaimer.

(21) Appl. No.: 17/731,330

(22) Filed: Apr. 28, 2022

(65) Prior Publication Data

US 2022/0263856 A1 Aug. 18, 2022

Related U.S. Application Data

(63) Continuation of application No. 16/904,617, filed on Jun. 18, 2020, now Pat. No. 11,425,159, which is a
(Continued)

(51) Int. Cl.
*G06F 11/00* (2006.01)
*G06Q 40/08* (2012.01)
*H04L 9/40* (2022.01)

(52) U.S. Cl.
CPC ......... *H04L 63/1433* (2013.01); *G06Q 40/08* (2013.01)

(58) Field of Classification Search
CPC . G06F 21/577; G06F 21/552; H04L 63/1441; H04L 63/1433; H04L 63/12;
(Continued)

(56) References Cited

U.S. PATENT DOCUMENTS

| 11,760,158 B2 | 3/2007 | Lippmann |
| 7,376,090 B2 * | 5/2008 | Horng ..................... H04L 43/00 370/252 |

(Continued)

OTHER PUBLICATIONS

Stotz et al., "INformation fusion engine for real-time decision-making (INFERD): a perceptual system for cyber attack tracking," 2007 10th International Conference on Information Fusion Year: 2007 pp. 1-8.*
(Continued)

*Primary Examiner* — Roderick Tolentino

(57) ABSTRACT

System and method for electronic risk and remediation analysis using network monitored sensors and actionable feedback methodologies for operational resilience. Various embodiments of the present technology include methods of assessing digital risks posed to a computer network of an entity that may result in a digital risk event, or privacy incident. The network includes information and technology assets that are subject to one or more security risk policies. In some exemplary embodiments, the method includes receiving a set of variables that are indicative of attributes of an infrastructure of an entity, including one or more information assets and or technology assets utilized by the entity. Some embodiments involve using computer agents deployed and configured to monitor network data transmitted via public networks, to private networks and collect continual or periodic data that is related to security information.

The method includes assessing the risk of a network security failure and generating a remediation of network security parameters based on the assessed risk by automatically making one or more changes to, or settings of, criteria of one or more network security policies, reducing the risk of computer network security failure for an entity and increasing digital operational resilience.

20 Claims, 10 Drawing Sheets

Related U.S. Application Data continuation of application No. 16/129,820, filed on Sep. 13, 2018, now Pat. No. 10,749,891, which is a continuation of application No. 15/696,202, filed on Sep. 6, 2017, now Pat. No. 10,122,751, which is a continuation of application No. 15/012,182, filed on Feb. 1, 2016, now Pat. No. 9,762,605, which is a continuation of application No. 13/322,298, filed as application No. PCT/GB2010/050818 on May 19, 2010, now Pat. No. 9,363,279.

(58) Field of Classification Search
CPC ............ H04L 63/1416; G06Q 10/0635; G06Q 10/063; G06Q 10/0637
See application file for complete search history.

(56) References Cited

U.S. PATENT DOCUMENTS

| | | | |
|---|---|---|---|
| 7,409,716 B2 * | 8/2008 | Barnett | H04W 36/30 726/22 |
| 7,774,451 B1 * | 8/2010 | Bogorad | G06F 21/56 709/223 |
| 8,402,546 B2 | 3/2013 | Greenshpon | |
| 8,839,440 B2 | 9/2014 | Yun et al. | |
| 9,143,523 B2 | 9/2015 | Evrard | |
| 11,321,620 B2 | 5/2022 | Saisamarth et al. | |
| 11,475,393 B2 | 10/2022 | Rajkhowa et al. | |
| 2002/0188870 A1 * | 12/2002 | Gong | H04L 63/0281 726/4 |
| 2003/0110396 A1 | 6/2003 | Lundy et al. | |
| 2004/0064543 A1 | 4/2004 | Ashutosh et al. | |
| 2004/0260947 A1 | 12/2004 | Brady et al. | |
| 2005/0066195 A1 * | 3/2005 | Jones | G06F 21/577 726/4 |
| 2005/0138413 A1 * | 6/2005 | Lippmann | G06F 21/577 726/4 |
| 2005/0091513 A1 | 12/2005 | Mitomo et al. | |
| 2005/0278786 A1 | 12/2005 | Tippett et al. | |
| 2006/0021050 A1 | 1/2006 | Cook et al. | |
| 2006/0206935 A1 * | 9/2006 | Choi | G06F 21/55 726/22 |
| 2007/0016955 A1 | 1/2007 | Goldberg et al. | |
| 2007/0067847 A1 | 3/2007 | Weimer et al. | |
| 2007/0113281 A1 | 5/2007 | Leach | |
| 2007/0234409 A1 * | 10/2007 | Eisen | H04L 63/0876 726/6 |
| 2008/0008085 A1 | 1/2008 | Gerstel | |
| 2008/0172716 A1 * | 7/2008 | Talpade | H04L 41/0869 726/1 |
| 2008/0222532 A1 * | 9/2008 | Mester | H04L 51/12 715/738 |
| 2009/0024627 A1 | 1/2009 | King | |
| 2009/0024663 A1 * | 1/2009 | McGovern | G06F 21/577 |
| 2009/0030751 A1 | 1/2009 | Barva et al. | |
| 2009/0126023 A1 * | 5/2009 | Yun | G06F 21/577 726/25 |
| 2009/0204471 A1 * | 8/2009 | Elenbaas | G06Q 10/06311 705/7.13 |
| 2010/0125912 A1 * | 5/2010 | Greenshpon | G06F 21/577 726/25 |
| 2010/0199351 A1 | 8/2010 | Protas | |

OTHER PUBLICATIONS

Stamp et al., "Reliability impacts from cyber attack on electric power systems," 2009 IEEE/PES Power Systems Conference and Exposition Year: 2009 pp. 1-8.*

Stotz et al.,"Informal fusion engine for real-time decision making (INFERD): a perceptual system for cyber attack tracking." 2007 10th International Conference on Information Fusion Year: 2007 pp. 1-8.

* cited by examiner

| Mitigation Action | Type | VaR reduction | Residual VaR | Mitigation cost | VaR reduction/ mitigation cost |
|---|---|---|---|---|---|
| No action | - | - | 250,000 | - | - |
| #1 | Insurance | 50,000 | 200,000 | 10,000 | 5 |
| #2 | Add 10 firewalls | 10,000 | 190,000 | 3,000 | 3.3 |
| #3 | Epoxy USB ports | 5,000 | 185,000 | 5,000 | 1 |
| #4 | Additional security guards | 3,000 | 182,000 | 20,000 | 0.15 |
| ... | ... | ... | ... | ... | ... |

SYSTEM AND METHOD FOR ELECTRONIC RISK ANALYSIS AND REMEDIATION USING NETWORK MONITORED SENSORS AND ACTIONABLE FEEDBACK METHODOLOGIES FOR OPERATIONAL RESILIENCE

The present application is a continuation application of U.S. application Ser. No. 16/904,617 Filed on Jun. 18, 2020 notice of allowance Mar. 30, 2022, which is a continuation of U.S. application Ser. No. 16/129,820 Filed on Sep. 13, 2018, which is a continuation of U.S. application Ser. No. 15/696,202 Filed Sep. 6, 2017, granted Jun. 11, 2018 which is a continuation of U.S. application Ser. No. 15/012,182 Filed Feb. 1, 2016, granted Sep. 12, 2017, which is a continuation of U.S. application Ser. No. 13/322,298 Filed Dec. 22, 2011, granted Jun. 7, 2016.

All the foregoing applications are hereby incorporated herein by reference in their entirety.

FIELD OF THE INVENTION

The present invention relates to apparatus for and a method of assessing threat to at least one computer network.

BACKGROUND ART

Large organisations, such as international banks and other financial institutions, rely heavily on their computer systems to carry out their business operations. Increasingly, organisations are connecting their networks to public networks, such as the Internet, to allow them to communicate with their customers and other organisations. However, in doing so, they open up their networks to a wider range and greater number of electronic threats, such as computer viruses, Trojan horses, computer worms, hacking and denial of-service attacks.

To respond to these forms of threat, organisations can implement procedures, tools and countermeasures for providing network security. For example, they can install intrusion detection and prevention systems to protect their network. However, even if these security systems are properly managed and well maintained, their network may still be vulnerable to threat. Furthermore, their network may also be vulnerable to other, non-electronic forms of threat, such as fire, flood or terrorism.

EP 1 768045A describes providing threat and risk analysis for a network comprising assets having interrelationships and interdependencies. Analysis involves using a "cut set" enumeration method. Cut sets can be used as the basis for threat and risk analysis since each cut set may affect the traffic between two dependent assets in the network and thereby affect a security state of the dependent assets, such as confidentiality, integrity or availability.

US 2003/0084349 A describes a method of detecting security threats. Security events based on network message traffic and other network security information are analyzed to identify validated security threats occurring on one or more networks. Alerts are prepared based on the results of the security analysis.

US 2005/0278786 A describes a method of assessing the risk to information resources. The method involves generating or using a security risk index. The security risk index may represent the security of information resources. The security risk index may be based on at least one factor, which may be individually quantified, and may include a threat factor associated with a rate or frequency of security events that threaten the security of the information resources, a vulnerability factor associated with a likelihood of a security event breaching the security of the information resources, an impact factor associated with an expected cost of a breach of the security of the information resources or another type of factor.

US 2003/0154393 A describes a method of managing security risk, where risk associated with a breach of security is analyzed and quantified according to weighted risk variables. The analysis is accomplished by a computerized security risk management system that receives information relating to physical, informational, communication and surveillance risk, and structures the information such that it can be related to risk variables and a security risk level can be calculated according to a relevance of associated risk variables. The security risk level can be indicative of a likelihood that a breach of security may occur relating to a particular transaction or facility. Similarly, a security confidence level can be indicative of how secure a particular facility or practice is and a security maintenance level can be indicative of a level of security that should be maintained in relation to an analyzed subject.

US 2006/0021050 A describes a method which includes assessing security of a computer network according to a set of at least one identified security syndrome by calculating a value representing a measure of security for each security syndrome. The identified security syndrome relates to the security of the computer network. The method also includes displaying a value corresponding to an overall security risk in the computer network based on the calculated measures for the at least one security syndrome.

The present invention seeks to provide an improved apparatus for and a method of assessing threat to a computer network or computer networks.

SUMMARY OF THE INVENTION

According to a first aspect of some embodiments of the present invention there is provided apparatus configured to determine predicted threat activity based on stochastic modelling of threat events capable of affecting at least one computer network in which a plurality of systems operate.

Thus, stochastic modelling can help to model the effect of low-frequency, high-impact events when assessing threats involving computer networks. This can be used, for example, in capital modelling, pricing insurance and cost benefit analysis when improving network security.

The apparatus may be further configured to determine expected downtime of each of said systems in dependence upon said predicted threat activity and to determine loss for each of a plurality of operational processes dependent on the downtimes of each of said systems and to add losses for said plurality of processes so as to obtain a combined loss arising from the threat activity.

The apparatus may be configured to model a set of threat events so as to obtain at least one model parameter.

The apparatus may be configured to model the set of threat events using regression. The first module may be configured to model the set of threat events using weighted regression. The apparatus may be configured to model the set of threat events using linear regression. The apparatus may be configured to model the set of threat events using exponential regression. The apparatus may be configured to model the set of threat events using at least two different models and to obtain at least two different sets of model parameters.

The at least one model parameter may include at least one parameter indicating goodness of fit of the model.

The apparatus may further comprise a user interface which is configured to present at least one model parameter to a user.

The apparatus may be configured to predict threat events using at least one model parameter and a stochastic model using said at least one model parameter. The apparatus may be configured to randomly draw at least one variable according to a predefined distribution and to use said at least one variable in the stochastic model. The apparatus may be configured to predict a distribution of threat events by repeating a simulation.

The apparatus may be configured to allow for parameter uncertainty.

The apparatus may further comprise a user interface which is configured to present an outcome of stochastic modelling to a user.

The apparatus may be configured to determine said predicted threat activity using a Monte Carlo method.

The apparatus may be configured to store at least one of the losses and the combined loss in a storage device. The apparatus may be configured to display at least one of the losses and the combined loss on a display device.

The apparatus may be configured to retrieve a list of observed threats and to determine the predicted threat activity based upon the list of observed threats. The observed list of threats may include, for each threat, information identifying at least one system. The observed list of threats may include, for each threat, information identifying frequency of occurrence of the threat. The frequency of occurrence of the threat may include at least one period of time and corresponding frequency of occurrence for the at least one period of time.

The plurality of systems may include a plurality of software systems.

The apparatus may comprise at least one computer system.

The loss may be value at risk.

The apparatus may comprise at least one computer system, wherein the or each computer system comprises at least one processor and memory, and the at least one computer system is configured to determine the predicted threat activity.

The apparatus may comprise at least one module including a first module configured to determine the predicted threat activity and to output the predicted threat activity. The apparatus may comprise at least two modules including a second module configured to determine the expected downtime of each of said systems. The apparatus may comprise a third module configured to determine loss for each of a plurality of operational processes dependent on the downtimes of each of said systems and to add losses for said plurality of processes so as to obtain a combined loss arising from the threat activity.

According to a second aspect of some embodiments of the present invention there is provided a method comprising determining predicted threat activity capable of affecting at least one computer networking which a plurality of systems operate.

The method may further comprise determining expected downtime of each system in dependence upon said predicted threat activity, determining loss for each of a plurality of operational processes dependent on the downtimes of the systems, adding losses for the plurality of processes to obtain a combined loss arising from the threat activity.

The determining of predicted threat activity based on stochastic modelling of threat events may comprise modelling a set of threat events so as to obtain at least one model parameter.

The determining of predicted threat activity based on stochastic modelling of threat events may include predicting threat events using at least one model parameter and a stochastic model using said at least one model parameter.

According to a third aspect of some embodiments of the present invention there is provided a computer program, which when executed by a computer system, causes the computer system to perform the method.

According to a fourth aspect of some embodiments of the present invention there is provided a computer readable medium storing the computer program.

BRIEF DESCRIPTION OF THE DRAWINGS

Certain embodiments of the present invention will now be described, by way of example, with reference to the accompanying drawings in which.

DETAILED DESCRIPTION OF CERTAIN EMBODIMENTS OF THE INVENTION

Figure 1:
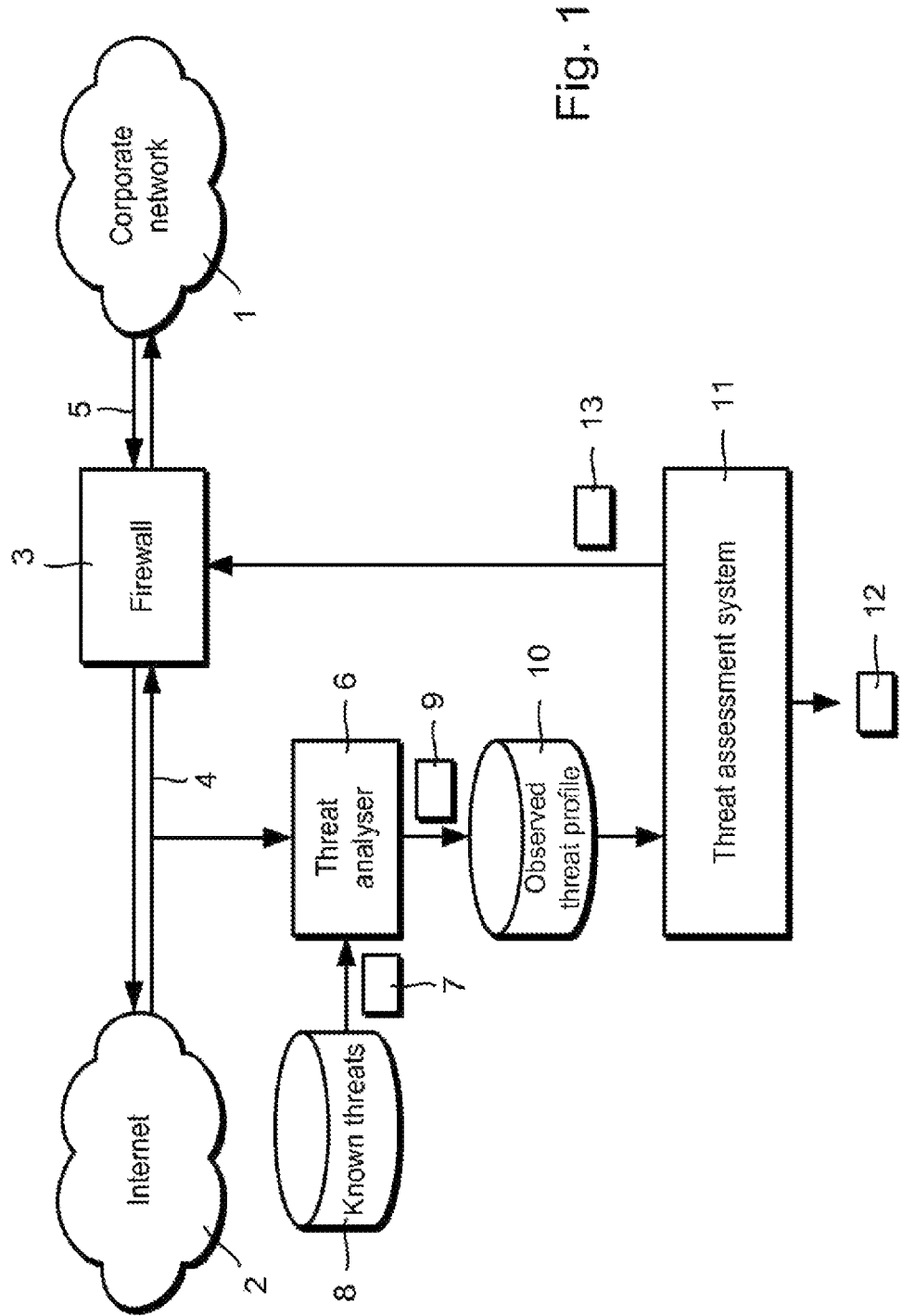
FIG. 1 is a schematic diagram of two computer networks connected via a firewall, a system for analysing network traffic and a system for assessing threat in one of the computer networks.

Referring to FIG. 1, a corporate network 1 is connected to an external network 2, in this case the Internet, via a firewall 3. The firewall 3 filters incoming traffic 4 from the Internet and, optionally, outgoing traffic 5, according to a security policy (not shown). The corporate network 1 may be provided a single, private network. The network 1 need not be a corporate network, but can be a government, academic, military or other form of private network. The network 1 may include a plurality of interconnected networks, for example which are geographically distributed.

The Internet 2 is a source of electronic threat, such as computer viruses (herein referred to simply as "viruses"), Trojan horses ("Trojans"), computer worms ("worms"), hacking and denial-of-service attacks. If a threat enters the corporate network 1 and is not stopped, then it can cause damage within the corporate network 1. For example, a virus may infect information technology (IT) systems 30 (FIG. 3) within the corporate network 1 resulting in the loss of one or more operational processes 31 (FIG. 3), for example a business process, either as a direct result of infection and/or as a result of measures taken to remove the virus from the infected system. Loss can also occur as the result of other forms of attack, such as hacking and denial-of-service attacks.

An IT system may be or include software, such as an operating system, an application ora combination of operating system and application(s). An IT system may be or include hardware, such as server(s), storage, network connections or a combination of one or more hardware elements. As will be explained in more detail later, some types of threat, such as virus, may affect software, and other types of threat, such as fire, may affect hardware and/or software. An IT system can be treated, for the purposes of assessing threats, as a combination of software and hardware.

Figure 3:
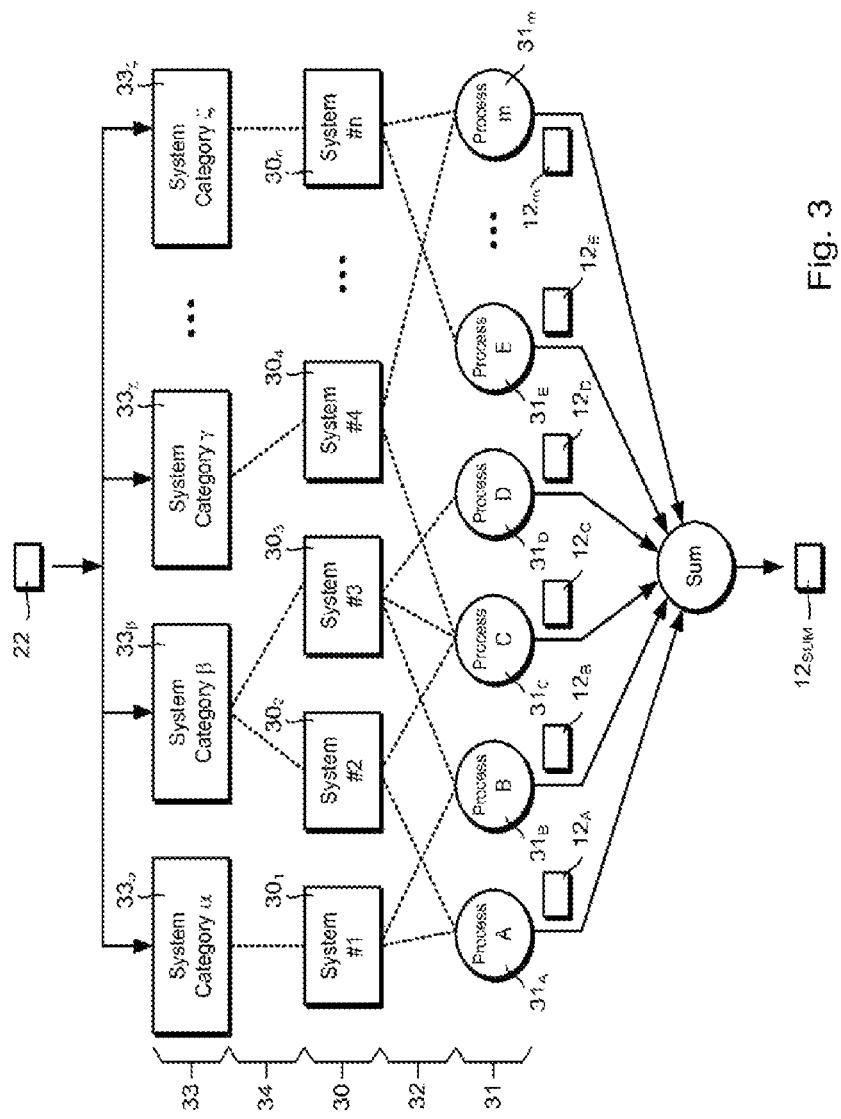
FIG. 3 illustrates calculation of loss arising from predicted threat.

The degree to which an organisation will be affected by a successful attack depends on a number of factors, such as the number of IT systems 30 (FIG. 3) affected by the attack and the number of operational processes 31 (FIG. 3) relying on the affected IT systems 30 (FIG. 3).

If the likelihood of an attack succeeding can be estimated for a number of different threats, then this can be combined with knowledge of the logical structure of IT systems 30 (FIG. 3) within the network 1 and knowledge of processes 31 (FIG. 3) dependent on those IT systems 30 (FIG. 3) to predict, for a given period of time, loss to the organisation due to these threats. In some embodiments, the predicted loss is expressed as a value at risk (VAR). However, the prediction may be expressed as any value or figure of merit which characterises or quantifies loss to the organisation arising from operational processes being disabled.

Determining the effect of viruses and other form of attack, for example in terms of an average or expected cost, may be of interest for a number of reasons, including capital modelling, use in pricing insurance against the effects of such attacks and in carrying out cost-benefit analysis for improving network security.

IT-related risks form part of the operational risk capital requirement for insurance. Broadly speaking, the capital to be held for a risk can be, for example, the value of the "1 in 200 year" event, though overall capital is significantly reduced by diversification between different risks. Thus, it can be useful to be to predict the potential variability in costs so that this cost can be assessed.

In general, insurance is priced at a margin above the expected claims, with the margin being in part related to the extent of the risk. Two risks with the same expected loss may attract very different insurance premiums if they exhibit very different characteristics in terms of variability of claims. Again, a process which can predict this variability will be much more useful in setting the premium than one that does not.

Finally, any cost-benefit analysis of potential security upgrades will need to look at the impact on "worst case scenarios" as well as the expected cost. For example, it may cost $1,000 to reduce the expected loss by $750. On that basis one may not proceed with the upgrade. However spending $1,000 may significantly reduce, or eliminate, the risk of a $100,000 risk. When looked at this way, the improvement is cost effective.

A module 6 (hereinafter referred to as a "threat analyser") samples incoming traffic 4 and identifies threats using a list 7 of known threats stored in a database 8. For example, the module 6 may be a computer system running SNORT (for example release 2.6.0.1) available from www.Snort.org.

The threat analyser 6 produces observed threat data 9, which includes a list of observed threats and their frequency of occurrence, and stores the data 9 in a database 10.

In some embodiments of the present invention, a system 11 for assessing threat uses models threats to the corporate network 1 so as to predict loss 12 arising from these threats and/or to provide feedback 13 to the firewall 3.

Each observed threat is defined using an identifier, a name, a description of the threat, a temporal profile specifying frequency of occurrence of the threat, a target (or targets) for the threat and a severity score for the (or each) target.

The identifier (herein the attribute "Threat ID" is used) uniquely identifies a threat. The Threat ID may be string of up to 100 characters. For example, the Threat ID may be "Win32. Word.B32m".

The target ("Target") is a system category attacked by the threat. Targets are preferably named in a systematic way. Examples of targets include "Windows. XP" or "Oracle. 9i". Targets can be identified at different levels using a format "system.version|-system.version|-system.version]]". For example, if a threat attacks Oracle running on Windows XP. then the target may be specified as "Oracle.9i-Windows. XP".

A system category may depend on other categories. For example, a company may have a system which depends on Windows Server 2003 and another system which depends on Windows XP, i.e. two different system categories. Thus, if a threat attacks more than one category, such as all versions of Windows, this can be handled by introducing a third system category, such as Windows, on which both of the other categories, in this example Windows Server 2003 and Windows XP, depend.

The severity score ("SeverityScore") is a measure of the impact of a successful threat. It is not a measure of the prevalence or exposure to the threat, but rather an indication of the damage that would be caused to the target system. Severity score may also be referred to as "damage level". In this example, the severity score is a value lying in a range between 1 and 10. For example, a value of 1 can represent trivial impact and a value of 10 may represent a catastrophic effect. However, the severity score may be defined as "low", "medium", "high" or "critical".

The temporal profile is used to describe frequency of occurrence of a threat because loss caused by system downtime may vary according to the time of the week. The temporal profile may be visible to and/or editable by a user for some types of threat, such as physical threats, and may be implicit and/or fixed for other types of threat, such as that defined in SNORT data.

The profile is expressed as a sequence of elements, each of which has a time block and a count of the observed occurrences of the threat during the block. Threat occurrences are preferably aggregated as far as possible to provide a simple profile whilst remaining consistent with recorded instances. A more complex profile can be used if the simple profile significantly deviates from recorded instances. For example, if a threat is observed only a very small number of times, then it is appropriate to specify a uniform time profile. However, if a different threat is observed many times and always, for example, on a Monday morning, then a more complex profile reflecting the actual distribution may be used.

Herein the temporal profile is defined in terms of day (attribute "Day"), period of day ("From", "To") and frequency ("Count").

Time blocks need not be same for different threats, although, for any given threat, blocks should do not overlap. If a part of a week is not covered by a block, threat occurrence is assumed to be zero.

The observed threat data is stored as a single file in Extensible Markup Language (XML) format encoded using 8-bit Unicode Transformation Format (UTF) as shown in the following simple example:

```
<?xml version="1.0" encoding="utf-8" 2× <AssessmentSystem Version = "1"
<Observed Threats ObservationStart="2006-07-31T00:00:00"
    ObservationEnd="2006-08-07T00:00:00"<Threat ID=*Win32.Worm.B32m"
Target="Windows. XP" SeverityScore="4">
<Observation From="00:00:00" To = "12:00:00" Count="8"/> <Observation From="12:00:00"
To-"00:00:00" Count="1"/> </Threat<ThreatID="Linux.Trojan.A12s" Target="Oracle.9i"
SeverityScore="6">
<Observation Day="Monday" Count="50"/> <Observation Day="Tuesday Wednesday"
Count="23°/> <Observation Day="Thursday Friday Saturday" Count="11"/> <Observation
Day="Sunday" Count="0"/> </Threat<Threat ID=*DenialOfService" Target="IIS"
SeverityScore="2"> <Observation Day="Sunday" From="00:00:00" To-"08:00:00"
Count="1154"/> <Observation Day="Sunday" From="08:00:00" To-"16:30:00" Count="237"/>
<Observation Day="Monday" To-"12:00:00° Count="350"/> <!--From is 00:00:00-->
<Observation Day="Monday" From="12:00:00" Count="208"/> <!--To is 00:00:00-->
<Observation Day="Tuesday Wednesday Thursday Friday Saturday" Count="2134"/>
</Threat</Observed Threats</AssessmentSystem >
```

In the example just given, three different types of observed threat are specified, namely a virus "Win32.Worm.B32m", a Trojan "Linux.Trojan.A12s" and a denial-of-service attack "DenialOfService". However, it will be appreciated that there may be many more observed threats, e.g. tens or hundreds of thousands of threats or more.

Figure 2:
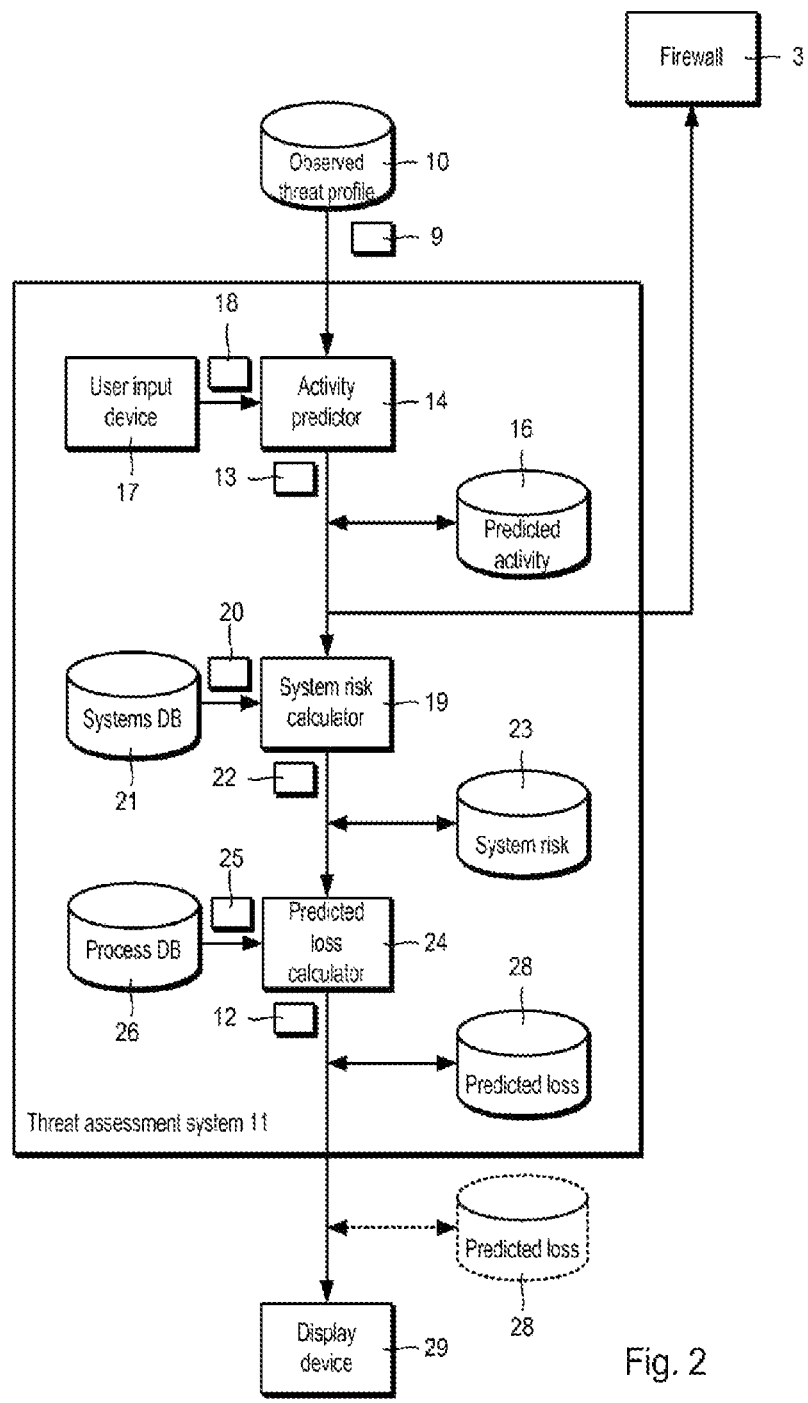
FIG. 2 is a detailed schematic diagram of the system for assessing threat to a computer network shown in FIG. 1.

Referring to FIG. 2, the threat assessment system 11 includes a first module 14 (hereinafter referred to as an "activity predictor") for predicting threat activity affecting the corporate network 1.

The activity predictor 14 receives the observed threat data 9 from the database 10, for example by retrieving the data automatically or in response to user instruction, extrapolates future event frequency and produces a profile 13 of predicted threat activity, which includes a list of predicted threats and their expected frequency of occurrence. The predicted threat activity profile 13 may be stored in a database 16.

Event frequency can be extrapolated from the historical data using a variety of editable factors which can be based upon advice from security consultants, political factors and so on.

Each predicted threat is defined using an identifier, a name, a description, a frequency of occurrence, a category (or categories) of system attacked and a corresponding damage level for each system.

A user, via input device 17, can manually add information 18 about other electronic and non-electronic forms of threat so that it can be added to the predicted threat activity profile 13.

Non-electronic forms of threat include, for example, fire, flood and terrorism attack. Information about non-electronic forms of attack is arranged in a similar way to information about electronic forms of threat and include, for each threat, an identifier, a name, a description and frequency of occurrence, categories of system attacked and corresponding damage levels.

The user can also provide or edit information about threat. For example, they can specify data regarding extrapolation factors, the IT systems subject to attack, such as its identity, name and category identity, systems categories, such as its identity and name, operational processes, such as its identity, name and value, and process dependencies, such as process identity, system identity, dependency description and dependency level.

As shown in FIG. 2, the predicted threat activity profile 13 can be fed back to the firewall 3 to tune its operation.

The threat assessment system 11 includes a second module 19 (hereinafter referred to as a "system risk calculator") for calculating system risk.

The system risk calculator 19 receives the predicted threat activity profile 13 (either from the activity predictor 14 or the database 16) and information 20 about the IT systems 30 (FIG. 3) and the categories to which they belong from a systems database 21 and produces a risk profile 22 to the systems 30 (FIG. 3) in terms of predicted average downtime over a given period, usually specified to be a year. The risk 22 can be stored in database 23.

Each IT system 30 (FIG. 3) is defined by identity and a name. System categories, i.e. targets, may include operating systems, applications and server location.

An IT system may be defined in terms of physical location. This may be used to identify threats to some types of threat, such as fire, flooding, terrorism, power loss and so on.

The system 11 includes a third module 24 (hereinafter referred to as a "predicted loss calculator") for predicting the loss to the organisation.

The predicted loss calculator 24 receives the system risk 22 and data 25 listing operational processes from a database 26, then predicts the loss for each operational process, aggregates the results for each process and outputs predicted loss data 12. The predicted loss data 12 may be stored in database 28 and/or output on display device 29.

Each process is defined by identity and a name, value in terms of the cost of downtime. The dependency of each process on an underlying IT system is defined by process identity, system identity, dependency description and dependency level.

Referring also to FIG. 3, the predicted loss calculator 24 considers the system risk 22 for the IT systems 30, $30_1$, $30_2$, $30_3$, $30_4$, ..., $30_m$, on which each process 31, $31_A$, $31_B$, $31_C$, $31_D$, $31_E$, ..., $31_m$, depends via dependencies 32 and the value of the process and aggregates values $12_A$, $12_B$, $12_C$, $12_D$, $12_E$, ..., $12_m$, for each process so as to produce a value $12_{sum}$, as for all processes. The predicted loss calculator 24 applies the system risk 22 to system categories 33, $33_a$, $33_B$, $33_x$, ..., $33_c$ which are related to the systems 30, $30_1$, $30_2$, $30_3$, $30_4$, ..., $30_n$, by dependencies 34 and the considers how the risk affects each IT system 30, $30_1$, $30_2$, $30_3$, $30_4$, ..., $30_n$.

In FIG. 3, only one level or layer of system category 33 is shown for clarity. However, as will be explained in more detail, there may be additional levels of system category 33 such that one or more system categories 33 in a lower level may depend on a system category in a higher level. Thus, a system 30 may depend on one or more system categories 33, which may arranged in one or more layers.

For example, a system category 33 in a higher level may be Windows and system categories 33 in a lower level may be Windows Server 2003 and Windows XP. A system 30 may be a corporate server which depends on Windows Server 2003 and another system 30 could be desktop computer which depends on Windows XP.

System categories 33 may be omitted and so threats to systems 30 may be considered directly.

The threat assessment system 11 can output a report of the predicted loss, e.g. an aggregate value at risk, to the organisation for each process in terms of process name, estimated annual downtime and predicted loss. For example, the report can be shown on the display device 29, for example, as a bar chart of predicted loss for each process and can be exported as a database file, such as an Microsoft® Excel® file (e.g., with an ".xls" extension) or in extensible Markup Language file, (e.g., with an ".xml' extension).

Figure 4:
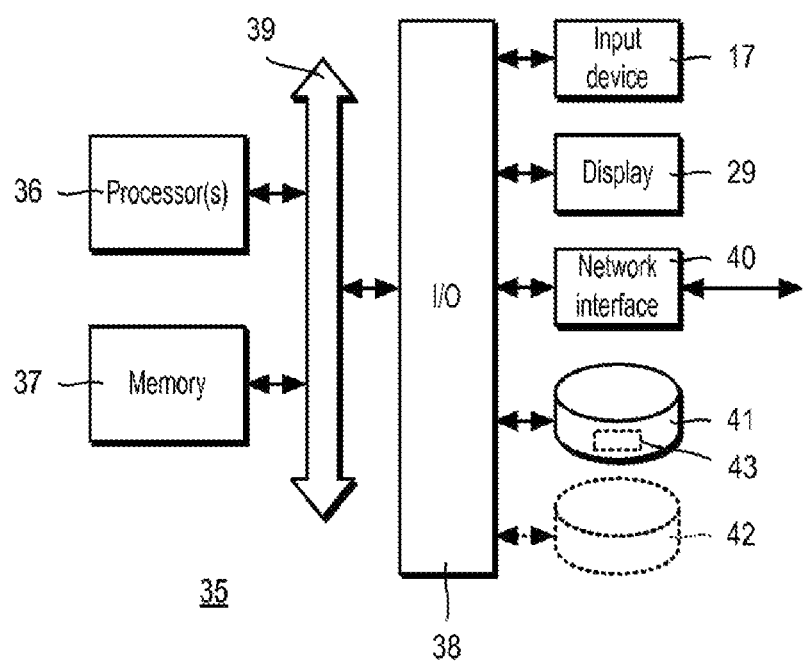
FIG. 4 is a schematic block diagram of a computer system providing threat assessment.
Figure 5A:
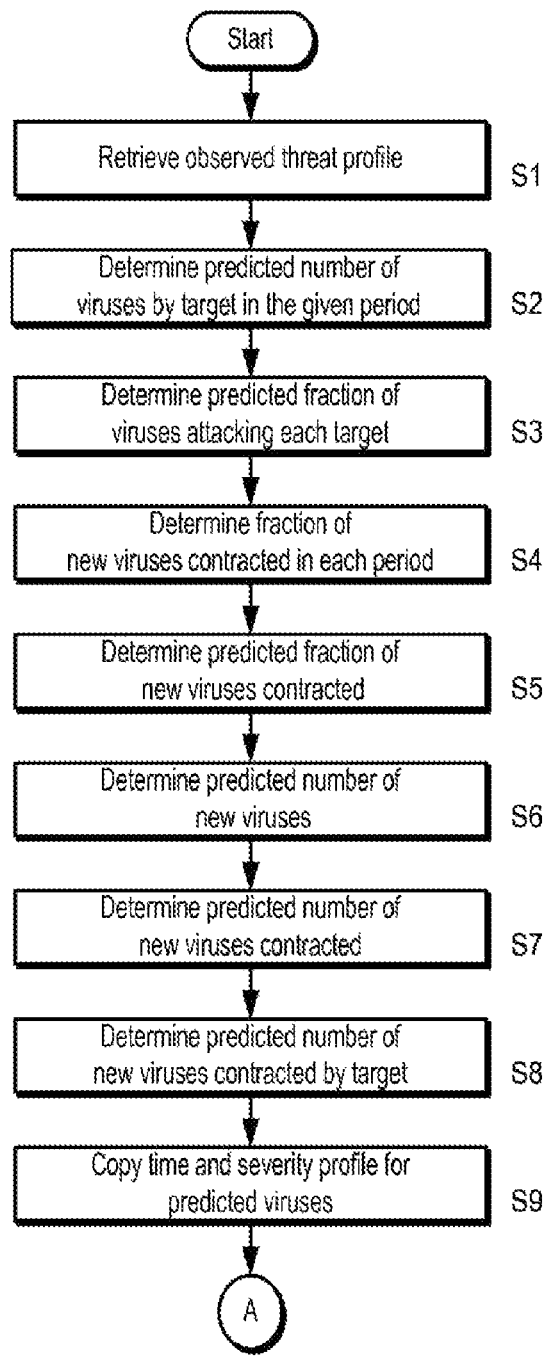
FIGS. 5A and 5B are process flow diagrams of a method of predicting threat activity.
Figure 5B:
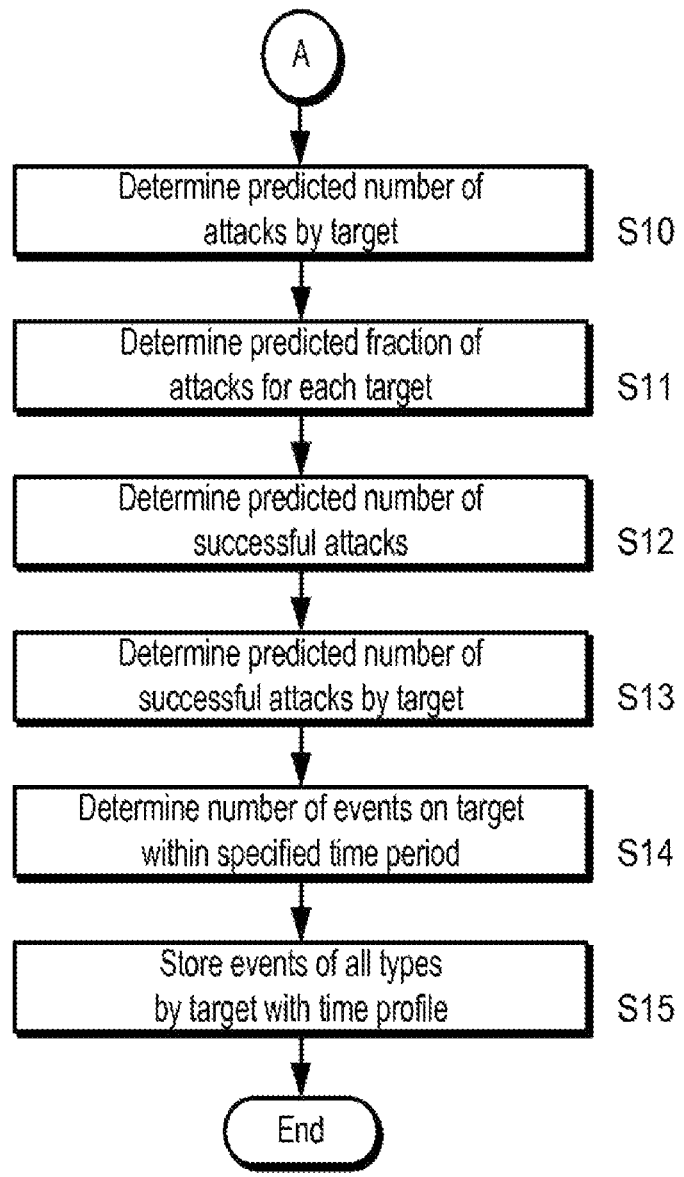
Figure 6:
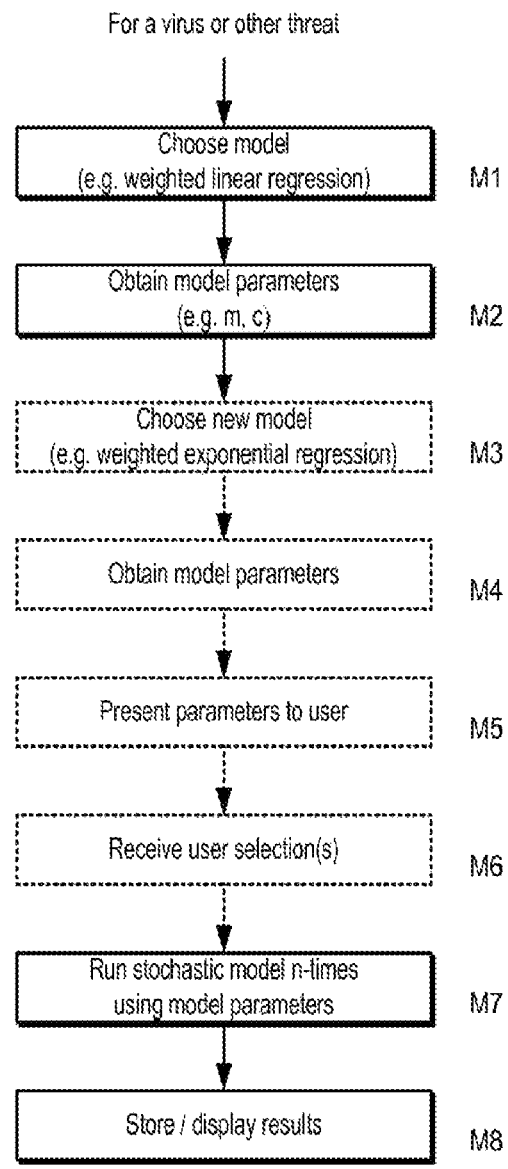
FIG. 6 is a process flow diagram of a method of modelling a given threat.
Figure 7:
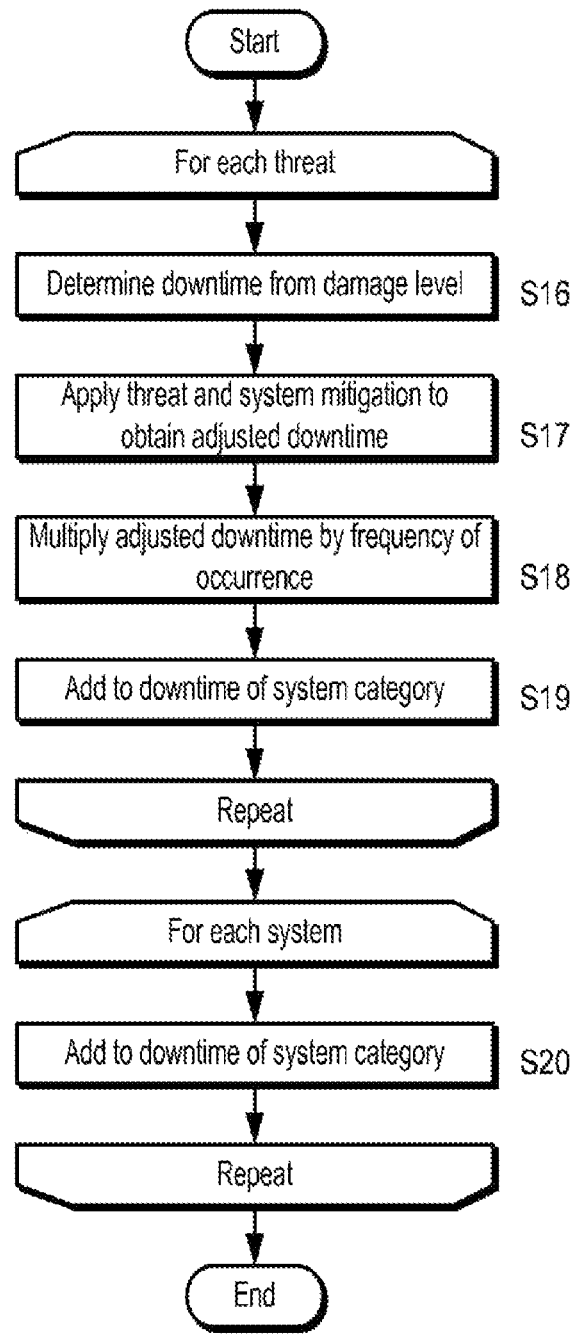
FIG. 7 is a process flow diagram of a method of calculating system risk.
Figure 8:
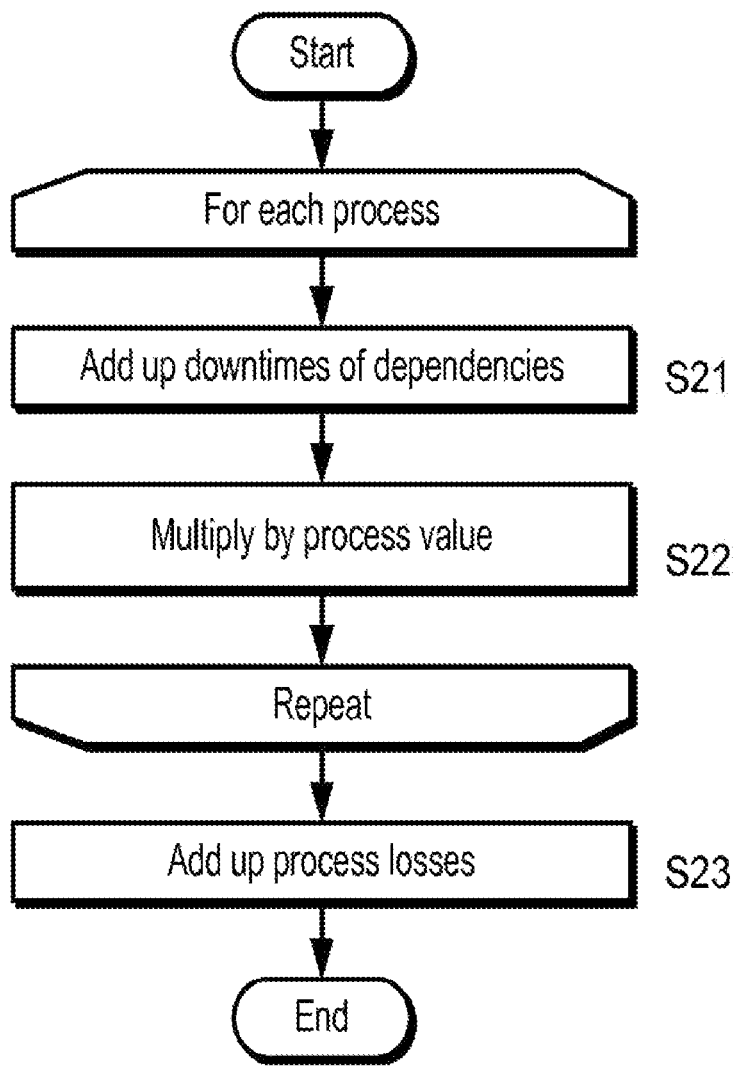
FIG. 8 is a process flow diagram of a method of calculating predicted loss.

Referring to FIG. 4, the threat assessment system 11 (FIG. 2) is implemented in software on a computer system 35 running an operating system, such as Windows, Linux or Solaris. The computer system 35 includes at least one processor 36, memory 37 and an input/output (I/O) interface 38 operatively connected by a bus 39. The I/O interface 38 is operatively connected to the user input 17 (for example in the form of a keyboard and pointing device), display 29, a network interface 40, storage 41 in the form of hard disk storage and removable storage 42.

Computer program code 43 is stored in the hard disk storage 38 and loaded into memory 37 for execution by the processor(s) 36 to provide the modules 14, 19, 24. The computer program code 43 may be stored on and transferred from removable storage 42 or downloaded via the network interface 42 from a remote source (not shown).

The threat assessment system 11 generally has two modes of operation to meet different operational criteria.

In a "live mode", the activity predictor 14 periodically, for example daily, connects to the known threat database 10 (which is preferably continuously updated), retrieves the observed threat profile 9 and produces a new predicted activity 13. The predicted activity 13 is fed back to the firewall 3.

In an "analysis mode", a snapshot of the observed threat profile 9 is taken, predicted loss is assessed and a report produced.

Operation of the threat assessment system 11 will now be described in more detail.

The threat assessment system 11 uses an activity prediction process to extrapolate series of numbers in several places to find the next value in the series. In effect, The threat assessment system 11 models uncertainty.

Before describing how the threat assessment system 11 operates in detail, a brief explanation of the different forms of uncertainty will first be described.

Three types of uncertainty may be considered, namely parameter uncertainty, process uncertainty and model uncertainty.

Uncertainty can be considered to be the (assessor's) lack of knowledge or level of ignorance about the parameters that characterise the physical system being modelled.

Parameter uncertainty or model-specification error (such as statistical estimation error) concerns a parameter that has a value which cannot be known with precision due to measurement or estimation error.

Uncertainty can be formally classified as Type A or Type B uncertainty. Type A uncertainty is due to stochastic variability with respect to a reference unit of the assessment question. Type B uncertainty is due to the lack of knowledge about items that are invariant with respect to the reference unit of the assessment question.

Process uncertainty (or "variability") arises as a result of the fact that even if true probabilities are correctly known, then an outcome is probabilistic and so cannot be predicted with certainty. Variability is the effect of chance and is a function of a system. It cannot be reduced through study or further measurement. Variability is sometimes referred to as "aleatory uncertainty", "stochastic variability" and "inter individual variability". Aleatory uncertainty arises because of natural, unpredictable variation in the performance of the system under study. Tossing a coin a number of times provides a simple illustration of variability. It is not possible to predict with certainty what the tosses of a coin will produce because of the inherent randomness of a coin toss.

Tossing a coin which may be biased can be used to explain the difference between parameter and process uncertainties. If the coin is tossed 10 times and results in 7 heads, the probability of obtaining a head may be judged to be 0.7. However, it is not certain that the probability is, in fact, for example, 0.6 or 0.8. This is an example of parameter uncertainty. If the coin is known to be fair, so that there is no parameter uncertainty, and it tossed 10 times, it would not be surprising if the outcome is, for example, 4 heads or 6 heads. This reflects process uncertainty.

As will be explained in more detail hereinafter, the threat assessment system 11 may allow for these types of uncertainty. The threat assessment system 11 can be instructed not to take account of these uncertainties or to take account of one or both types of uncertainty so that comparisons can be made.

Model uncertainty is a condition of analysis when specification of the model of the analysed process is open to doubt. Another fundamental source of model uncertainty is the necessity for models to be simple enough to provide an efficient link between theory and reality.

Complicated models may be less useful than simple ones even though the accuracy of the description of simple models of the process may be more doubtful.

A failure to account for statistical model uncertainty often leads to overconfidence in the results of a statistical study. There are no standardized ways to specify a prior that would represent model uncertainty Model uncertainty is the risk that the model used, e.g. linear extrapolation, is the incorrect model. For example, the question of whether the number of viruses grows linearly or exponentially is a question of model risk.

Weighted linear extrapolation can be used. Weighted linear extrapolation involves fitting a straight line y=mx+c through supplied data, finding values for the parameters m and c, and then using these parameters to find a value for y corresponding to a value of x beyond the range of that data.

A so-called "best fit" line is the one which is as close to as many of the supplied data points as possible. The closeness at a single point $x_i$, is given by the residual $r_i$, namely:

$$r_i = y_i - (mx_i + c) \quad (1)$$

The overall quality of fit is given by the summed square of all the residuals, each weighted by the corresponding weighting factor:

$$S' = \sum_{i=1}^{n} wi(yi - (mxi + c))^2 \quad (2)$$

The best fit line is found by minimising S' with respect to m and c.

The minimum may be found by differentiating S' with respect to m and c.

$$\frac{\partial S'}{\partial c} = -2\sum wx(y - (mx + c)) \quad (3)$$

$$\frac{\partial S'}{\partial c} = -2\sum w(y - (mx + c)) \quad (4)$$

where the summations are from 1 to n for w, x and y.

The minimum is found where the differentials are 0. therefore:

$$\sum wx(y - (mx + c)) = 0 \quad (5)$$

$$\sum w(y - (mx + c)) = 0 \quad (6)$$

$$\sum wxy - m\sum wx^2 - c\sum wx = 0 \quad (7)$$

$$\sum wy - m\sum wx - c\sum w = 0 \quad (8)$$

Equation (8) may be re-arranged to find c;

$$c = \frac{\sum wy - m\sum wx}{\sum w} \quad (9)$$

and, by substitution, m can be found:

$$m = \frac{\sum w \sum wxy - \sum wx \sum wy}{\sum w \sum wx2 - (\sum wx)2} \quad (10)$$

Analogously, $$m = \frac{\sum wy - c\sum w}{\sum wx} \quad (11)$$

$$\sum wxy - \frac{\sum wx2}{\sum wx}(\sum wy - c\sum w) - \sum wx = 0 \quad (12)$$

$$\sum wx\sum wxy - \sum wx2\sum wy = c((\sum wx)2 - \sum w\sum wx2) \quad (13)$$

$$c = \frac{-\sum wx\sum wxy + \sum wx2\sum wy}{\sum w\sum wx2 - (\sum wx)2} \quad (14)$$

Given m and c from the formulae above, the series may be extrapolated to point n+1:

$$y_{n+1} = mx_{n+1} + c \quad (15)$$

Extrapolation can be achieved in several different ways, as will now be explained in more detail:

Linear Model

Extrapolation can be achieved using a linear model. Suppose there are n data points. The aim is to fit the following model expressed in Equation (16) below:

$$y = mx + c + \varepsilon \quad (16)$$

where $\varepsilon$=Normal $(0.\sigma^2)$, i.e. a random variable drawn from a normal distribution having zero value of mean ($\mu$–0) and non-zero variance ($\sigma 2>0$).

Let $\hat{m}$, $\hat{c}$ and $\hat{\sigma}$ be estimates of the true parameters m, c and $\sigma$.

The equations for weighted linear regression can be expressed in matrix form, namely:

$$y = \begin{pmatrix} y1 \\ y2 \\ \vdots \\ \vdots \\ yn \end{pmatrix} x = \begin{pmatrix} x1 & 1 \\ x2 & 1 \\ \vdots & \vdots \\ \vdots & \vdots \\ xn & 1 \end{pmatrix} w = \begin{pmatrix} w1 & 0 & \cdots & \cdots & 0 \\ 0 & w2 & \cdots & & \vdots \\ \vdots & \cdots & \cdots & \cdots & \vdots \\ \vdots & & \cdots & \cdots & 0 \\ 0 & \cdots & \cdots & 0 & w2 \end{pmatrix} \quad (17)$$

where $x_i$ is the time value of the $i^{th}$ data point, $y_i$ is the value of the $i^{th}$ data point and $w_i$ is the weight assigned to the value of the $i^{th}$ data point.

Let $$\hat{\beta} = \begin{pmatrix} \hat{m} \\ \hat{c} \end{pmatrix}$$

be a matrix containing weighted least squares estimates $\hat{m}$ and $\hat{c}$ of true values m and c.

The weighted sum square deviations of data from sampled points can be minimised by applying regression theory to the estimate:

$$\hat{\beta} = (X^T \cdot W \cdot X)^{-1} \cdot X^T \cdot W \cdot Y \quad (18)$$

and, thus, give the estimates $\hat{m}$, $\hat{c}$. In Equation 18, "·" denotes matrix multiplication, "$^{-1}$" denote matrix inversion and "$^T$" denotes matrix transposition.

The actual "deviations" involved in this estimate can be captured in a matrix, R, defined as:

$$R = Y - X \cdot \hat{\beta} \quad (19)$$

The overall deviation can be captured as a single number, SS, called "Sum Square residuals", where:

$$SS = (R^T \cdot R) = \sum_{i=1}^{n}(yi - \hat{m}x_i + \hat{c}))^2 \quad (20)$$

This can be used to estimate the remaining parameter, σ, using the formula:

$$\hat{\Sigma} = \sqrt{\frac{ss}{n-2}} \quad (21)$$

where the value n−2 is used instead of n because two degrees of freedom have been lost in having to estimate $\hat{m}$ and $\hat{c}$.

The quantity $\hat{\sigma}$ is a measure of process uncertainty.

Standard deviations of the estimates of the true parameters m and c can be obtained using a variance-covariance matrix V defined as:

$$V = \frac{ss}{n-2}(X^T \cdot W^{-1} \cdot X)^{-1} \quad (22)$$

V can be interpreted as a 2×2 matrix:

$$V = \begin{pmatrix} v_{1:1} & v_{1:2} \\ v_{2:1} & v_{2:2} \end{pmatrix} \quad (23)$$

from which Sample Standard Deviations can be obtained:
Sample Standard Deviation, SD(m), of m $\sqrt{v_{1:1}}$
Sample Standard Deviation, SD(c), of c $\sqrt{v_{2:2}}$
Sample Standard Deviation, ρ, of $$m \ \& \ \frac{v_{1:2}}{\sqrt{v_{1:1}} \times \sqrt{v_{2:2}}}$$

which are measures of parameter uncertainty.

Therefore, a central estimate $\hat{y}_{n+k}$ for any k≥=1 given known $x_{n+k}$ is:

$$\hat{y}_{n+k} = \hat{m} x_{n+k} + \hat{c} \quad (24)$$

It is assumed that m and c are normally distributed as an adequate approximation to their true distribution. It is also assumed that any contribution of to parameter uncertainty is negligible.

Exponential Model

As explained above, regression can be based on a linear model. However, if the number of viruses (or other form of attack) grows exponentially over time, then the number of viruses in the future may be underestimated using such a model.

One solution is to extend regression to include an exponential term. Another solution is to calculate a linear regression, but also carry out a second regression where the natural logarithm of the data points is regressed against predictors.

Using an exponential model, instead of fitting:

$$y = mx + c + \varepsilon \quad (16)$$

where ε☐Normal (0, σ²)
the following fit is used, namely:

$$\log(y) = mx + c + \varepsilon \quad (16')$$

where ε☐Normal (0, σ²) and log ( ) is the natural logarithm,

The same approach can be used as that for the linear model, except that Y is defined as:

$$Y = \begin{pmatrix} \log(y_1) \\ \log(y_2) \\ \vdots \\ \log(y_n) \end{pmatrix}$$

The final central estimate for $\hat{\gamma}_{n+k}$ is found using:

$$\hat{y}_{n+k} = e^{(mx_{n+k} + \hat{c})} \quad (24')$$

and the sum of the squared residuals for the exponential model is:

$$SS^{exp} = \sum_{i=1}^{n} (y_i - e^{(mx_i + \hat{c})})^2 \quad (20')$$

As will be explained later, the use of more than one model can be helpful. Thus, the sum of the squares for the exponential model can be compared with that of the linear model. The model having the lower value can be chosen as the better fit.

Other models can be used, for example, using one or more polynomial terms.

The model can be modified to take into account flexible time steps. For example, time steps can be equally spaced, e.g. monthly. However, a prediction can be made for a time step at any point in the future, i.e. not necessarily monthly.

Regression techniques tend to lend themselves well to modelling the uncertainty.

However, it is possible to extend the regression calculations so that rather than just giving out a best estimate of each parameter, a distribution for each parameter can be produced, centred about the best estimate.

It is also possible to obtain correlations between the various parameter estimates. By looking at the residuals, i.e. differences between the data and fitted model, it is also possible to get an idea of the process uncertainty, i.e. how uncertain the actual outcome may be even when the parameters in the model are known.

Prediction Using Simulation Based on Model Parameters

To find out the range of possible values that a predicted value of y might take, many simulations can be run. Within each simulation, predication using the regression follows a two step process.

The first step involves determining the values of the parameters m and c to use in a projection.

If no allowance is to be made for parameter uncertainty, then the estimates m and c of estimates true values m and c can be used in the projection, i.e.:

$$m = \hat{m}$$
$$c = \hat{c}$$

If, on the other hand, allowance is to be made for parameter uncertainty, then account is taken of the fact m and c are themselves random variables.

The simulations are calibrated so that they have the correct statistical properties.

A matrix, L, is defined, namely:

$$L = \begin{pmatrix} SD_{(m)} & 0 \\ \rho \cdot SD_{(c)} & SD_{(c)}\sqrt{1-\rho^2} \end{pmatrix} \quad (25)$$

which is the Cholesky Decomposition of the matrix V.
A matrix, Z, is defined, namely:

$$Z = \begin{pmatrix} z_1 \\ z_2 \end{pmatrix} \quad (26)$$

where $z_1$ and $z_2$ are independently drawn from a standard Normal distribution, i.e. a Normal distribution with mean 0 and variance 1. Thus, $z_1$ and $z_2$ usually take on different values from one simulation to another.

The parameters for projection for a simulation are calculated as:

$$\begin{pmatrix} m \\ c \end{pmatrix} = \begin{pmatrix} \hat{m} \\ \hat{c} \end{pmatrix} + L \cdot Z \quad (27)$$

The second step involves determining the projected quality of interest (e.g. number of viruses) using the values of m and c.

If no allowance is made for parameter uncertainty, then a projection is made using, for a linear mode, Equation 24, or using an exponential model, Equation 24':

$$\hat{y}_{n+k} = \hat{m} x_{n+k} + \hat{c} \quad (24)$$
$$\hat{y}_{n+k} = e^{(\hat{m} x_{n+k} + \hat{c})} \quad (24')$$

If allowance is made for process uncertainty, then a projection is made based on, for each k, a value of $z_k$, drawn from a standard Normal distribution N(0,1):

$$\hat{y}_{n+k} = \hat{m} x_{n+k} + \hat{c} + \hat{\sigma} z_k \quad (24a)$$
$$\hat{y}_{n+k} = e^{(\hat{m} x_{n+k} + \hat{c} + \hat{\sigma}_k)} \quad (24a')$$

As explained earlier, allowance can be made for the uncertainty in the costs of each successful virus or attack. For example, an assumption can be made that they follow a lognormal distribution, where the mean and standard deviation are specified by the user. A lognormal distribution is a "skewed" or asymmetric distribution has greater scope for costs to be higher than expected and/or lower than expected.

An allowance can be made for parameter uncertainty, i.e. the uncertainty over the true mean and standard deviation, as well as process uncertainty, i.e. that costs are log normally distributed. This can be used as guide to users. For example, users can be prompted to use a mean and standard deviation slightly above this best estimate as a proxy for parameter uncertainty.

As hereinbefore described, a stochastic model for low frequency/high impact events is used. This involves specifying probability distributions for the number of events and the impact of each of those events. For example, a Poisson distribution for the number of viruses or attack can be used and a lognormal distribution for the impact of the virus can be employed. A Poisson distribution uses one parameter, for example, the expected number of attacks. Parameter uncertainty can be allowed for through prudent assumptions specified by the user.

The model can be implemented using a Monte Carlo simulation. This involves generating thousands of scenarios of what may happen and then calculating summary statistics from the results.

As explained earlier, each simulation involves replacing each regression with a two-stage process, namely simulating the parameters from their assumed distributions and simulating the quality of interest using the parameters generated.

In some embodiments, a total cost can be calculated by multiplying the number of successful viruses or attacks by an assumed cost. However, in certain embodiments, the appropriate number of times can be sampled from the lognormal distribution and summed to get the total cost.

Referring to FIGS. 1 to 6, operation of the activity predictor 14 will be described in more detail.

The activity predictor 14 retrieves the observed threat data 9 from the observed threat database 10 (step S1) and sets about determining a time profile for each target, each time profile defined in terms of one of more time blocks and the number of successful threats expected in each time block (steps S2 to S13).

In this example, threats are generally divided into three categories, namely malicious codes (e.g. viruses, Trojans and worms), attacks (e.g. hacking and denial-of-service attacks) and non-electronic forms of attack (e.g. fire and terrorist attacks). Fewer categories may be defined, for example, by excluding non-electronic forms of attack. However, additional categories or sub-categories may be defined or added, for example as new forms of threat emerge. It will be appreciated that these threats can be assessed in any order and may even be evaluated simultaneously, for example, if a multi-core computer system 35 is used.

Equations (9), (10) and (15) and/or (13), (14) and (15) above are used to predict the number of viruses (or other forms of malicious code) using input data specified in Table I below:

TABLE I

| Item | Source | Symbol |
| --- | --- | --- |
| Number of viruses seen by target t and period p | SNORT | $obs_{t/p}^v$ |
| Number of viruses contracted by period p | User | $contr_p^v$ |
| Number of new viruses worldwide by period p | www.wildlist.org | $new_p^v$ |

The number of viruses seen by a target in a period, $obs_{t/p}^v$, is obtained from the threat analyser 6 running SNORT (or other intrusion detection program). The number of viruses contracted in the given period of time, $contr_p^v$, is specified, via input device 17, by the user. The number of new viruses worldwide in a period, $new_p^v$, is obtained from a virus (or other malicious software) information gathering organisation, such as The Wildlist Organization (www.wildlist.org). The period, p, may be, for example, one week or four weeks. However, other periods, such n-weeks or n-months may be used, where n is positive integer.

The activity predictor 14 takes the number of viruses seen by a target for a given period of time, $obs_{t/p}^v$, and extrapolates the observed viruses to give the predicted number of viruses by target in the given period, $pred_p^v$ (step S2). The value for each target will be used to calculate the number of viruses expected to be contracted by the target.

The activity predictor 14 normalises the predicted number of viruses by target in the given period, $pred_p^v$, to give a predicted fraction of viruses attacking each target, frac $pred_t^v$, by dividing the predicted number, $pred_t^v$, by the total number of new malicious codes which have been observed over the same period (step S3).

Steps S2 and S3 can be summarised as follows:

$$Obs_{t,p}^v \xrightarrow{\text{extrapolate}} pred_t^v \xrightarrow{\text{normalise}} frac\, pred_t^v$$

The activity predictor 14 divides the number of viruses contracted in each period, $contr_p^v$ by the number of new viruses worldwide in that period, $new_p^v$, to give the fraction of new viruses contracted in each period, frac $contr_p^v$ (step S4). The activity predictor 14 extrapolates this value to give the predicted fraction of new viruses that will be contracted, pred frac $contr^v$ (step S5).

Steps S4 and S5 can be summarised as follows:

$$contr_p^v \frac{contrv_p}{newv_p} = fraccontr_p^v \xrightarrow{\text{extrapolate}} predfraccontr^v$$

The activity predictor 14 extrapolates the number of new viruses, $new_p^v$, to give a predicted number of new viruses (step S6), i.e.:

$$new_p^v \xrightarrow{\text{extrapolate}} pred\, new^v$$

The activity predictor 14 multiplies the predicted fraction of new viruses that will be contracted, pred frac $contr^v$, by the number of new viruses, $new_p^v$, to give the predicted number of new viruses contracted, pred $contr^v$ (step S7), i.e.:

$$pred\, contr^v = pred\, frac\, contr^v \times pred\, new^v$$

The activity predictor 14 multiplies the fraction of viruses for each target, frac $pred_t^v$, by the predicted number of viruses contracted, pred $contr^v$, to give the predicted number of viruses contracted by target, pred $contr_t^v$ (step S8), namely:

$$pred\, contr_t^v = frac\, pred_t^v \times pred\, contr^v$$

Finally, the activity predictor 14 copies the time and severity profile for predicted viruses contracted directly from $obs_{t/p}^v$ (step S9). For example, for each instance of a virus, the identity of the virus together with its time profile and severity profile is added to a table. This provides the predicted number of viruses contacted by target with time profile.

The activity predictor 14 uses equations (9), (10) and (15) and/or (13), (14) and (15) to carry out a similar process for predicting the number of hacking, denial-of-service attacks and other similar forms of attack, using input data specified in Table II below, using the following steps:

Table II

| Item | Source | Symbol |
| --- | --- | --- |
| Number of attacks seen by target t and period p | SNORT | $obs_{t/p}^a$ |
| Number of successful attacks by period p | User | $contr_p^a$ |

The activity predictor 14 extrapolates observed attacks, $obs_{t/p}^a$, to give predicted number of attacks by target, $pred_t^a$ (step S10) and normalises this to give predicted fraction of attacks attacking each target, frac $pred_t^a$ (step S11).

Steps S10 and S11 can be summarised as follows:

$$obs_{t/p}^a \xrightarrow{\text{extrapolate}} pred_t^a \xrightarrow{\text{normalise}} frac\, pred_t^a$$

The activity predictor 14 extrapolates the number of successful attacks to give the predicted number of successful attacks, pred $contr^a$ (step S12), i.e.:

$$contr_p^a \xrightarrow{\text{extrapolate}} pred\, contr^a$$

The activity predictor 14 multiplies the predicted number of successful attacks, pred $contr^a$, by predicted fraction of attacks attacking each target, frac $pred_t^a$, to give the predicted number of successful attacks by target (step S13), i.e.

$$pred\, contr_t^a = frac\, pred_t^a \times pred\, contr^a$$

The activity predictor 14 copies time and severity profile for predicted successful attacks directly from $obs_{t/p}^a$ For non-electronic threats, the user can provide the expected number of disabling events on the target with a given time profile (step S14).

The activity predictor 14 stores the expected number of malicious codes, attacks and disabling events in the predicted threat activity profile 13 (step S15).

Referring to FIGS. 1 to 4 and 7, operation of the system risk calculator 19 will now be described in more detail.

For each threat, the risk calculator 19 carries out the following steps, namely steps S16 to S19.

The risk calculator 19 determines downtime for a system category 33, i.e. a target, based on the expected damage level for the successful threat (step S16). In this example, this is done using the value of the attribute "SeverityScore" using a look-up table giving a downtime for each SeverityScore for each system category. The risk calculator 19 can adjust the downtime, for example by taking into account mitigating factors, such as whether the system can operate in a safe mode and whether back-up systems are available (step S17). The risk calculator 19 multiplies each adjusted downtime by the frequency of occurrence of the successful threat to obtain a value of the total downtime for the threat (step S18). The risk calculator 19 then adds the downtime to an accumulated downtime for the system category (step S19).

For each system 30, the risk calculator 19 adds up downtimes of dependencies of the system categories 33 on which the system 30 depends and, if appropriate, dependencies of the system categories on which those system dependencies depend (step S20). Circular dependencies among categories may be forbidden.

Referring to FIGS. 1 to 4 and 8, operation of the predicted loss calculator 24 will now be described in more detail.

For each operational process, the predicted loss calculator 24 adds up predicted downtimes of the system categories on which it depends to determine a duration for which the process is unavailable (step S21). The predicted loss calculator 24 multiplies the duration by a value of the process to quantify the loss $12_A$, $12_B$, $12_C$, $12_D$, $12_E$ . . . . , $12_m$, for the process (step S22). For example, the value of the process may be a monetary value (e.g. given in pounds sterling per hour or dollars per day) and the loss may be value at risk for the process.

Once losses $12_A$, $12_B$, $12_C$, $12_D$, $12_E$ . . . , $12_m$ for each process have been determined, the predicted loss calculator 24 adds the losses $12_A$, $12_B$, $12_C$, $12_D$, $12_E$ . . . . , $12_m$, for all the processes to obtain a loss to the organisation (step S23).

The loss $12_A$, $12_B$, $12_C$, $12_D$, $12_E$ . . . , $12_m$ for each process and the loss $12_{sum}$, to the organisation can be stored in database 28 and/or exported. As explained earlier, some or all of the losses $12_A$, $12_B$, $12_C$, $12_D$, $12_E$ . . . , $12_m$ as can be displayed, for example as a bar chart, on display device 29.

The methods hereinbefore described may be used in one or more different applications, such as capital modelling, pricing insurance against the effects of attack and/or carrying out a cost-benefit analysis for improving network security.

Figures 9, 10:
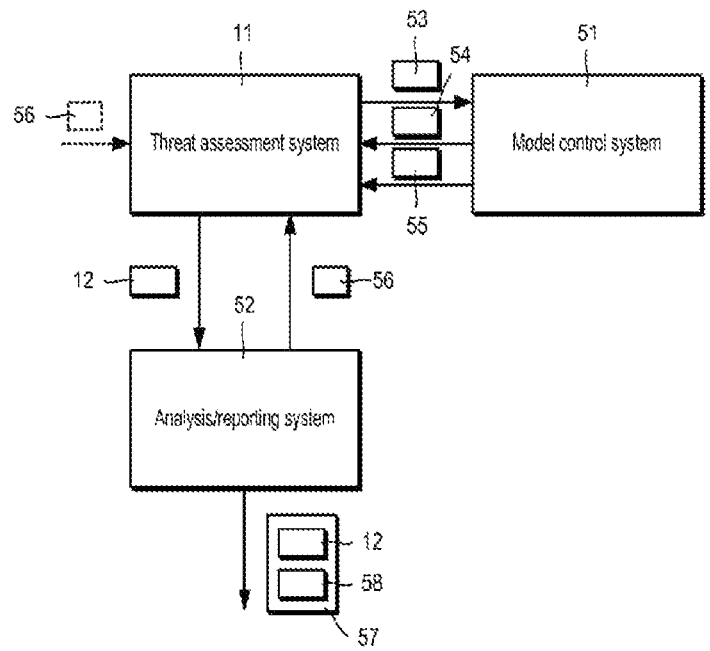
FIG. 9 is a schematic diagram of the threat assessing system shown in FIG. 2, a model controlling system and a reporting system.
FIG. 10 shows a table illustrating how the threat assessing system can be used.

Referring to FIG. 9, the threat assessment system 11 can be controlled using a model control system 51 and an analysis/reporting system 52.

The model control system 51 can be used by a user to view and analyse simulations 53 for any given virus or attack. The user can control the modelling process using instructions 54, which may include, for example, setting whether an allowance should be made for parameter uncertainty. Thus, the user can iteratively change models and so settle upon an appropriate model, for example, the model which is judged to be the most realistic. The model control system 51 can control the threat assessment 11 with little or no real-time user input, e.g. vary inputs in a predefined manner and judge results according to predefined measure. Once an appropriate model has been chosen, the model control system 51 can confirm, set or pass model parameters 53 for a given virus or threat to the threat assessment system 11 to be stored and/or used in predicting threat activity.

The model control system 51 can repeat this process for one or more of the viruses or threats.

The threat assessment system 11 predicts activity, calculates system risk and predicts loss as described earlier so as to obtain a value at risk 12.

The value at risk 12 can be supplied to the analysis/reporting system 52.

The analysis/reporting system 52 can generate or receive (from a user) inputs or settings 56 which are supplied to the threat assessment system 11. The system 52 can receive one or more values of value at risk 12 and can generate a report 57 which may include some or all of the values 12 and/or other information 58, such as metrics, which can be used in capital modelling, pricing insurance and/or carrying out a cost-benefit analysis for improving network security.

For example, value at risk 12 can be used to carry out cost-benefit analysis by working out a value at risk 12 for a given network configuration and assessing the impact of risk mitigation associated with implementing additional security measure(s). This is achieved by changing the configuration (or other aspect) of the network under scrutiny (via inputs 56), calculating a new value at risk or reduction in value at risk and comparing the change with the cost of implementing the additional security measure. Thus, the system or user can determine whether it is cost effective to implement the additional security measure(s).

FIG. 10 illustrates an example of a table 58 which might be included in a report 57. The table 57 lists a plurality of measures 59, a corresponding value 60 of the reduction in value at risk associated with implementing the measure (e.g. expressed in $, € or some other currency), a residual value at risk 12, a cost 61 of implementing the security measure and a ratio 62 of the reduction 60 and implementation cost 61.

As shown in the table 58, starting from an initial value of value at risk $12_1$ (i.e. value at risk for the current system without any additional security measures), the effect of different security measures can be analysed. In this example, the reduction in value at risk associated with taking out appropriate insurance is five times that of the cost of taking out the insurance. Insurance might be used to pay for a system to be restored after an attack. Therefore, taking out insurance, in this example, appears to be very cost effect. Likewise, adding additional firewalls is also cost effective. However, other measures, such as rending USB ports unusable by filling them with epoxy is cost-neutral, whereas the cost of introducing additional security guards outweighs any reduction in value at risk. Thus, as user, such as an IT manager, can make informed choices about implementing security measures.

Value at risk can be used in different ways, for example, for pricing insurance or (as shown earlier) evaluating whether it is cost effective to take out insurance.

In FIG. 9, the threat assessment system 11, model control system 51 and the analysis/reporting system 52 are shown as separate systems. However, the model control system 51 and the analysis/reporting system 52 can be combined into one system. Alternatively, the model control system 51 and/or the analysis/reporting system 52 can be integrated into the threat assessment system 11. The threat assessment system 11, model control system 51 and an analysis/reporting system 52 can be implemented in the computer system 35 (FIG. 4).

It will be appreciated that many modifications may be made to the embodiments hereinbefore described. The threat assessment system, model control system 51 and/or the analysis/reporting system 52 may be provided with a web interface to allow remote access by a user.

What is claimed is:

1. A system, comprising:
one or more networks comprising information and technology assets, a threat assessment system, a system risk calculator, an activity predictor, a predicted loss calculator, a model control system and an analysis and reporting system, comprised of one or more processors and memory communicatively coupled with the processor and or processors, the memory storing instructions;

one or more computer agents deployed between a public network, or networks and a private network, or networks configured to collect continual, or periodic security information that is related to digital risk events and, or privacy incidents from at least publicly accessible information and to continuously monitor network data transmitted via a public network, or networks, to a private network, or networks and via private network or networks and public networks;

receiving, by the activity predictor, observed digital risk events and, or privacy incidents within network traffic and collected security information that is related to digital risk events and, or privacy incidents from at least publicly accessible information, to extrapolate future digital risk events and, or privacy incidents frequency using a Monte Carlo method, using polynomial regression to create distributions from the said digital risk events and, or privacy incidents prediction and producing one or more profiles of predicted digital risk events and, or privacy incidents activity, producing an electronic digital risk events and, or privacy incidents profile, including at least, for each digital risk events and, or privacy incidents, an identifier, a name, a description of the digital risk event and, or privacy incident, the frequency of occurrence of each digital risk event and, or privacy incident within a time block, a target or targets, for each digital risk event and, or privacy incident and a severity score for each target;

determining a time profile for each target of the one or more digital risk events and, or privacy incidents, each time profile defined in terms of one, or more, time blocks and the number of successful digital risk events and, or privacy incidents expected in each time block;

receiving, by the system risk calculator, the one or more predicted digital risk events and, or privacy incidents profiles, information about the information assets and or technology assets and the categories to which they belong from a systems database and produces a risk profile to the information assets and or technology assets expressed as predicted downtime over a given period, determining downtime for an information and or technology assets category based on the expected damage level for a successful digital risk event and, or privacy incident;

summing by the system risk calculator downtimes of dependencies of the system categories on which systems depend and, or the dependencies of the system categories on which system dependencies depend;

receiving by the predicted loss calculator, system risk and data listing operational businesses processes from a database, to predict future potential loss for each operational business process, aggregating the results for each operational business process, outputting predicted potential loss data, expressed as any value or figure of merit, to be stored in a database and, or to a display device;

adding up, by the predicted loss calculator, for each operational business process, the predicted potential downtimes of the system categories on which each operational business process depends, determining a duration for which the operational business process is unavailable and multiplying the duration by a value of the operational business process to quantify future potential loss expressed as any value or figure of merit which characterises, or quantifies loss to the organisation arising from operational one or more processes being disabled to be stored in a database and, or to a display device; and automatically outputting the predicted future one or more digital risk events and, or privacy incidents profiles to provide feedback to the firewall, or firewalls through making one or more changes to, or settings of, criteria of one, or more, network security policies via updating network security device policy trees network and network security device logs enhancing their accuracy and temporal attributes and firewall ID signatures rules in the sets of network security device rules;

said feedback to the firewall, or firewalls resulting in changes to the one or more settings of, criteria of one, or more, network security policies via updating network security device policy trees and the network security device logs, said changes to the firewall logs then updating the firewall reporting system management tools and or security event management system; and enabling greater accuracy in the deep packet inspection and risk evaluation of data packets within the network traffic prior to allowance to the destination address, according to the criteria changed by the receipt of feedback in order to protect the private network, or networks from malicious programs, unauthorized access, malware, and denial-of-service (DoS) attacks;

identifying unused and or hidden firewall rules currently included in the firewall policy, thereby reducing risk to the organization, improving performance of the firewall and ensuring that the firewall rule sets and configurations are in line with business and organizational firewall compliance requirements.

2. The system of claim 1, comprising calculating a quantified loss, or ranges of losses for a given configuration and topology of one, or more, private networks using data acquired by the threat assessment system, extrapolating predicted future electronic digital risk events and or information incidents using said acquired electronic digital risk events and or information incidents and security information data, modelling via Monte Carlo simulations to specify one, or more, probability distributions for the number of electronic digital risk events and or information incidents and the impact of each of said electronic digital risk events and or information incidents and generating an initial quantified loss or ranges of losses with the residual quantified loss, or ranges of losses assigned as the initial value;

recalculating a range of quantified loss, or ranges of losses after one, or more, simulated changes to the configuration and topology of the one, or more, private networks, through additional security actions, using the model control system and determining a range of quantified loss, or ranges of losses and the subsequent residual risk exposures for each simulated additional security action mitigating the potential effects of the predicted electronic digital risk events and or information incidents;

generating one or more tables listing a plurality of security measures and the corresponding values of the reduction in risk exposure associated with implementing each mitigation measure expressed in a currency, or any other metric, selected by a user and storing and or displaying the one or more simulations via a display device.

3. The system of claim 1, wherein the quantified loss or range of losses, expressed as any values or figures of merit, for one or more given information assets and or technology assets configurations, are stored for comparative analysis of variance with the quantified loss or range of loses after a firewall has received feedback and has changes automatically made to its configuration parameters via updating of firewall device policy trees and or device logs, from changes to one or more predicted future digital risk events and, or privacy incidents profiles, the resulting loss, or range of losses and configurations, from both prior and following changes made in the configuration parameters of a firewall, being stored and, or displayed on a display device.

4. The system of claim 3, wherein the analysis and reporting system receives measures of variance between quantified loss, or range of loses, before and after a firewall has changes automatically made to its configuration parameters resulting from feedback, said analysis and reporting system confirming, setting and or passing model parameters for one or more digital risk events and, or privacy incidents, generating one or more reports which may include some, or all, of the values of measures of variance between quantified loss, or range of loses, before and after a firewall has changes automatically made to its configuration parameters resulting from feedback, for the one or more technology assets and or information assets configurations and displaying said measures of variance between quantified loss, or range of loses on a display device.

5. The system of claim 1, comprising calculating a range of future predicted risk values arising from electronic digital risk events and or information incidents in a future time block, by multiplying the number of successful electronic digital risk events and or information incidents in a specified time block from observed historic threat data within network traffic inbound and or outbound for one or more private network infrastructures, by an assumed loss value using a Monte Carlo simulation, to attain total predicted future electronic digital risk events and or information incidents risk value or values and displaying and or storing said value, or values.

6. The system of claim 1, wherein the model control system controls the modeling process, varying inputs according to predefined rules relating to measures of variance between quantified loss, or range of loses, before and after a firewall has changes automatically made to its configuration parameters resulting from feedback and confirming, setting and or passing model parameters for one or more digital risk events and, or privacy incidents, to be stored and or used in predicting electronic threat activity and outputting said quantified loss, or range of loses, for one or more digital risk events and, or privacy incidents, to the analysis reporting system and or a display device.

7. The system of claim 6, comprising selecting Monte Carlo model parameters by the model control system, to create an allowance for uncertainty in the cost impact of successful electronic digital risk events and or information incidents, as well as process uncertainty and parameter uncertainty, according to a predefined manner and or a user input, the model control system confirming, setting, or passing said model parameters to the threat assessment system and presenting the simulations for given digital risk events and or information incidents to a user on a display device, generating one or more reports and, or storing the simulations and or model parameters.

8. The system of claim 1, wherein the analysis and reporting system receives quantified loss, or range of losses, expressed as any values or figures of merit, for one, or more, private network topologies;
simulating the addition of one or more additional security elements to the one, or more, private network topologies under scrutiny via inputs and calculating a new quantified loss, or range of losses, expressed as any values or figures of merit;
comparing the quantified loss values resulting from one or more simulated changes, to the one or more private network topology by adding additional security elements, with varying costs of said elements, with the quantified loss or range of losses prior to the addition of one, or more, additional security measures;
generating one or more reports, including one or more values for the costs of implementing the one or more simulated security measures and in terms of an average, or expected cost, a ratio of the reduction and implementation cost, capital modelling and, or cost-benefit metrics, identifying within the one or more generated reports an identification of optimal capital allocation to the one or more additional security element implementations improving network security;
the one or more values for the costs of implementing the one or more simulated security measures and in terms of an average, or expected cost, a ratio of the reduction and implementation cost, capital modelling and, or cost-benefit metrics, identifying within the one or more generated reports an identification of optimal capital allocation to the one or more additional security element implementations resulting from simulated additional security measures to the topology of private network assets, being stored and, or output to a display device.

9. The system of claim 1, comprising generating, or receiving by the analysis and reporting system, inputs and or settings using a variety of editable factors from a user, for non-electronic digital risk events and or information incidents historical data frequency that have technology asset and information asset negative impact potential and adding said data to the predicted threat activity profile to include, for each threat, an identifier, a name, a description and frequency of occurrence, operational processes, categories of system attacked, process dependencies including but not limited to, process identity, system identity, dependency description, dependency level and for one or more non-electronic digital risk events and or information incidents input, the corresponding damage levels;
aggregating the risk values from predicted electronic digital risk events and or information incidents with predicted risk values from non-electronic digital risk events and or information incidents having potential negative impact upon technology and information assets of a private network, generating one or more reports for the said aggregated risk values and storing and or displaying them on a display device.

10. A method performed by one or more computers, the method comprising:
one or more networks comprising information and technology assets, a threat assessment system, a system risk calculator, an activity predictor, a predicted loss calculator, a model control system and an analysis and reporting system, comprised of one or more processors and memory communicatively coupled with the processor and or processors, the memory storing instructions;

one or more computer agents deployed between a public network, or networks and a private network, or networks configured to collect continual, or periodic security information that is related to digital risk events and, or privacy incidents from at least publicly accessible information and to continuously monitor network data transmitted via a public network, or networks, to a private network, or networks and via private network or networks and public networks;

receiving, by the activity predictor, observed digital risk events and, or privacy incidents within network traffic and collected security information that is related to digital risk events and, or privacy incidents from at least publicly accessible information, to extrapolate future digital risk events and, or privacy incidents frequency using a Monte Carlo method, using polynomial regression to create distributions from the said digital risk events and, or privacy incidents prediction and producing one or more profiles of predicted digital risk events and, or privacy incidents activity, producing an electronic digital risk events and, or privacy incidents profile, including at least, for each digital risk events and, or privacy incidents, an identifier, a name, a description of the digital risk event and, or privacy incident, the frequency of occurrence of each digital risk event and, or privacy incident within a time block, a target or targets, for each digital risk event and, or privacy incident and a severity score for each target;

determining a time profile for each target of the one or more digital risk events and, or privacy incidents, each time profile defined in terms of one, or more, time blocks and the number of successful digital risk events and, or privacy incidents expected in each time block;

receiving, by the system risk calculator, the one or more predicted digital risk events and, or privacy incidents profiles, information about the information assets and or technology assets and the categories to which they belong from a systems database and produces a risk profile to the information assets and or technology assets expressed as predicted downtime over a given period, determining downtime for an information and or technology assets category based on the expected damage level for a successful digital risk event and, or privacy incident;

summing by the system risk calculator downtimes of dependencies of the system categories on which systems depend and, or the dependencies of the system categories on which system dependencies depend;

receiving by the predicted loss calculator, system risk and data listing operational businesses processes from a database, to predict future potential loss for each operational business process, aggregating the results for each operational business process, outputting predicted potential loss data, expressed as any value or figure of merit, to be stored in a database and, or to a display device;

adding up, by the predicted loss calculator, for each operational business process, the predicted potential downtimes of the system categories on which each operational business process depends, determining a duration for which the operational business process is unavailable and multiplying the duration by a value of the operational business process to quantify future potential loss expressed as any value or figure of merit which characterises, or quantifies loss to the organisation arising from operational one or more processes being disabled to be stored in a database and, or to a display device; and automatically outputting the predicted future one or more digital risk events and, or privacy incidents profiles to provide feedback to the firewall, or firewalls through making one or more changes to, or settings of, criteria of one, or more, network security policies via updating network security device policy trees network and network security device logs enhancing their accuracy and temporal attributes and firewall ID signatures rules in the sets of network security device rules;

said feedback to the firewall, or firewalls resulting in changes to the one or more settings of, criteria of one, or more, network security policies via updating network security device policy trees and the network security device logs, said changes to the firewall logs then updating the firewall reporting system management tools and or security event management system; and enabling greater accuracy in the deep packet inspection and risk evaluation of data packets within the network traffic prior to allowance to the destination address, according to the criteria changed by the receipt of feedback in order to protect the private network, or networks from malicious programs, unauthorized access, malware, and denial-of-service (DoS) attacks;

identifying unused and or hidden firewall rules currently included in the firewall policy, thereby reducing risk to the organization, improving performance of the firewall and ensuring that the firewall rule sets and configurations are in line with business and organizational firewall compliance requirements.

11. The method of claim 10, comprising calculating a quantified loss, or ranges of losses for a given configuration and topology of one, or more, private networks using data acquired by the threat assessment system, extrapolating predicted future electronic digital risk events and or information incidents using said acquired electronic digital risk events and or information incidents and security information data, modelling via Monte Carlo simulations to specify one, or more, probability distributions for the number of electronic digital risk events and or information incidents and the impact of each of said electronic digital risk events and or information incidents and generating an initial quantified loss or ranges of losses with the residual quantified loss, or ranges of losses assigned as the initial value;

recalculating a range of quantified loss, or ranges of losses after one, or more, simulated changes to the configuration and topology of the one, or more, private networks, through additional security actions, using the model control system and determining a range of quantified loss, or ranges of losses and the subsequent residual risk exposures for each simulated additional security action mitigating the potential effects of the predicted electronic digital risk events and or information incidents;

generating one or more tables listing a plurality of security measures and the corresponding values of the reduction in risk exposure associated with implementing each mitigation measure expressed in a currency, or any other metric, selected by a user and storing and or displaying the one or more simulations via a display device.

12. The method of claim 10, wherein the quantified loss or range of losses, expressed as any values or figures of merit, for one or more given information assets and or technology assets configurations, are stored for comparative analysis of variance with the quantified loss or range of loses after a firewall has received feedback and has changes automatically made to its configuration parameters via updating of firewall device policy trees and or device logs, from changes to one or more predicted future digital risk events and, or privacy incidents profiles, the resulting loss, or range of losses and configurations, from both prior and following changes made in the configuration parameters of a firewall, being stored and, or displayed on a display device.

13. The method of claim 10, wherein the analysis and reporting system receives measures of variance between quantified loss, or range of loses, before and after a firewall has changes automatically made to its configuration parameters resulting from feedback, said analysis and reporting system confirming, setting and or passing model parameters for one or more digital risk events and, or privacy incidents, generating one or more reports which may include some, or all, of the values of measures of variance between quantified loss, or range of loses, before and after a firewall has changes automatically made to its configuration parameters resulting from feedback, for the one or more technology assets and or information assets configurations and displaying said measures of variance between quantified loss, or range of loses on a display device.

14. The method of claim 10, comprising calculating a range of future predicted risk values arising from electronic digital risk events and or information incidents in a future time block, by multiplying the number of successful electronic digital risk events and or information incidents in a specified time block from observed historic threat data within network traffic inbound and or outbound for one or more private network infrastructures, by an assumed loss value using a Monte Carlo simulation, to attain total predicted future electronic digital risk events and or information incidents risk value or values and displaying and or storing said value, or values.

15. The method of claim 10, wherein the model control system controls the modeling process, varying inputs according to predefined rules relating to measures of variance between quantified loss, or range of loses, before and after a firewall has changes automatically made to its configuration parameters resulting from feedback and confirming, setting and or passing model parameters for one or more digital risk events and, or privacy incidents, to be stored and or used in predicting electronic threat activity and outputting said quantified loss, or range of loses, for one or more digital risk events and, or privacy incidents, to the analysis reporting system and or a display device.

16. The method of claim 10, comprising selecting Monte Carlo model parameters by the model control system, to create an allowance for uncertainty in the cost impact of successful electronic digital risk events and or information incidents, as well as process uncertainty and parameter uncertainty, according to a predefined manner and or a user input, the model control system confirming, setting, or passing said model parameters to the threat assessment system and presenting the simulations for given digital risk events and or information incidents to a user on a display device, generating one or more reports and, or storing the simulations and or model parameters.

17. The method of claim 10, wherein the analysis and reporting system receives quantified loss, or range of losses, expressed as any values or figures of merit, for one, or more, private network topologies;

simulating the addition of one or more additional security elements to the one, or more, private network topologies under scrutiny via inputs and calculating a new quantified loss, or range of losses, expressed as any values or figures of merit;

comparing the quantified loss values resulting from one or more simulated changes, to the one or more private network topology by adding additional security elements, with varying costs of said elements, with the quantified loss or range of losses prior to the addition of one, or more, additional security measures;

generating one or more reports, including one or more values for the costs of implementing the one or more simulated security measures and in terms of an average, or expected cost, a ratio of the reduction and implementation cost, capital modelling and, or cost-benefit metrics, identifying within the one or more generated reports an identification of optimal capital allocation to the one or more additional security element implementations improving network security;

the one or more values for the costs of implementing the one or more simulated security measures and in terms of an average, or expected cost, a ratio of the reduction and implementation cost, capital modelling and, or cost-benefit metrics, identifying within the one or more generated reports an identification of optimal capital allocation to the one or more additional security element implementations resulting from simulated additional security measures to the topology of private network assets, being stored and, or output to a display device.

18. The method of claim 10, comprising generating, or receiving by the analysis and reporting system, inputs and or settings using a variety of editable factors from a user, for non-electronic digital risk events and or information incidents historical data frequency that have technology asset and information asset negative impact potential and adding said data to the predicted threat activity profile to include, for each threat, an identifier, a name, a description and frequency of occurrence, operational processes, categories of system attacked, process dependencies including but not limited to, process identity, system identity, dependency description, dependency level and for one or more non-electronic digital risk events and or information incidents input, the corresponding damage levels;

aggregating the risk values from predicted electronic digital risk events and or information incidents with predicted risk values from non-electronic digital risk events and or information incidents having potential negative impact upon technology and information assets of a private network, generating one or more reports for the said aggregated risk values and storing and or displaying them on a display device.

19. The method of claim 10, comprising calculating a quantified loss, or ranges of losses for a given configuration and topology of one, or more, private networks using data acquired by the threat assessment system, extrapolating predicted future electronic digital risk events and or information incidents using said acquired electronic digital risk events and or information incidents and security information data, modelling via Monte Carlo simulations to specify one, or more, probability distributions for the number of electronic digital risk events and or information incidents and the impact of each of said electronic digital risk events and or information incidents and generating an initial quantified loss or ranges of losses with the residual quantified loss, or ranges of losses assigned as the initial value;

recalculating a range of quantified loss, or ranges of losses after one, or more, simulated changes to the configuration and topology of the one, or more, private networks, through additional security actions, using the model control system and determining a range of quantified loss, or ranges of losses and the subsequent residual risk exposures for each simulated additional security action mitigating the potential effects of the predicted electronic digital risk events and or information incidents;

generating one or more tables listing a plurality of security measures and the corresponding values of the reduction in risk exposure associated with implementing each mitigation measure expressed in a currency, or any other metric, selected by a user and storing and or displaying the one or more simulations via a display device.

20. A non-transitory computer readable medium having a computer program thereon, which when executed by a computer system having one or more computer processors and a non-transitory computer readable memory, causes the computer system to perform steps comprising: one or more networks comprising information and technology assets, a threat assessment system, a system risk calculator, an activity predictor, a predicted loss calculator, a model control system and an analysis and reporting system, comprised of one or more processors and memory communicatively coupled with the processor and or processors, the memory storing instructions; one or more computer agents deployed between a public network, or networks and a private network, or networks configured to collect continual, or periodic security information that is related to digital risk events and, or privacy incidents from at least publicly accessible information and to continuously monitor network data transmitted via a public network, or networks, to a private network, or networks and via private network or networks and public networks; receiving, by the activity predictor, observed digital risk events and, or privacy incidents within network traffic and collected security information that is related to digital risk events and, or privacy incidents from at least publicly accessible information, to extrapolate future digital risk events and, or privacy incidents frequency using a Monte Carlo method, using polynomial regression to create distributions from the said digital risk events and, or privacy incidents prediction and producing one or more profiles of predicted digital risk events and, or privacy incidents activity, producing an electronic digital risk events and, or privacy incidents profile, including at least, for each digital risk events and, or privacy incidents, an identifier, a name, a description of the digital risk event and, or privacy incident, the frequency of occurrence of each digital risk event and, or privacy incident within a time block, a target or targets, for each digital risk event and, or privacy incident and a severity score for each target;

determining a time profile for each target of the one or more digital risk events and, or privacy incidents, each time profile defined in terms of one, or more, time blocks and the number of successful digital risk events and, or privacy incidents expected in each time block;

receiving, by the system risk calculator, the one or more predicted digital risk events and, or privacy incidents profiles, information about the information assets and or technology assets and the categories to which they belong from a systems database and produces a risk profile to the information assets and or technology assets expressed as predicted downtime over a given period, determining downtime for an information and or technology assets category based on the expected damage level for a successful digital risk event and, or privacy incident;

summing by the system risk calculator downtimes of dependencies of the system categories on which systems depend and, or the dependencies of the system categories on which system dependencies depend;

receiving by the predicted loss calculator, system risk and data listing operational businesses processes from a database, to predict future potential loss for each operational business process, aggregating the results for each operational business process, outputting predicted potential loss data, expressed as any value or figure of merit, to be stored in a database and, or to a display device;

adding up, by the predicted loss calculator, for each operational business process, the predicted potential downtimes of the system categories on which each operational business process depends, determining a duration for which the operational business process is unavailable and multiplying the duration by a value of the operational business process to quantify future potential loss expressed as any value or figure of merit which characterises, or quantifies loss to the organisation arising from operational one or more processes being disabled to be stored in a database and, or to a display device; and automatically outputting the predicted future one or more digital risk events and, or privacy incidents profiles to provide feedback to the firewall, or firewalls through making one or more changes to, or settings of, criteria of one, or more, network security policies via updating network security device policy trees network and network security device logs enhancing their accuracy and temporal attributes and firewall ID signatures rules in the sets of network security device rules;

said feedback to the firewall, or firewalls resulting in changes to the one or more settings of, criteria of one, or more, network security policies via updating network security device policy trees and the network security device logs, said changes to the firewall logs then updating the firewall reporting system management tools and or security event management system; and enabling greater accuracy in the deep packet inspection and risk evaluation of data packets within the network traffic prior to allowance to the destination address, according to the criteria changed by the receipt of feedback in order to protect the private network, or networks from malicious programs, unauthorized access, malware, and denial-of-service (DoS) attacks;

identifying unused and or hidden firewall rules currently included in the firewall policy, thereby reducing risk to the organization, improving performance of the firewall and ensuring that the firewall rule sets and configurations are in line with business and organizational firewall compliance requirements.

\* \* \* \* \*